United States Patent
Tatsumi (10) Patent No.: US 9,225,667 B2
(45) Date of Patent: Dec. 29, 2015

(54) COMMUNICATION SYSTEM AND NETWORK RELAY APPARATUS

(71) Applicant: Hitachi Metals, Ltd., Tokyo (JP)

(72) Inventor: Tomoyoshi Tatsumi, Tsuchiura (JP)

(73) Assignee: HITACHI METALS, LTD., Tokyo (JP)

( * ) Notice: Subject to any disclaimer, the term of this patent is extended or adjusted under 35 U.S.C. 154(b) by 35 days.

(21) Appl. No.: 14/061,571

(22) Filed: Oct. 23, 2013

(65) Prior Publication Data

US 2014/0133351 A1 May 15, 2014

(30) Foreign Application Priority Data

Nov. 14, 2012 (JP) .................................. 2012-250327

(51) Int. Cl.
*H04L 12/933* (2013.01)
*H04L 12/935* (2013.01)

(52) U.S. Cl.
CPC ................ *H04L 49/15* (2013.01); *H04L 49/10* (2013.01); *H04L 49/3009* (2013.01)

(58) Field of Classification Search
None
See application file for complete search history.

(56) References Cited

U.S. PATENT DOCUMENTS

| 8,396,067 | B2 | 3/2013 | Miyoshi et al. | |
|---|---|---|---|---|
| 2007/0280258 | A1* | 12/2007 | Rajagopalan et al. | 370/395.3 |
| 2010/0316053 | A1 | 12/2010 | Miyoshi et al. | |
| 2011/0075559 | A1* | 3/2011 | Katsura et al. | 370/231 |
| 2011/0149986 | A1* | 6/2011 | Sugawara | 370/401 |
| 2011/0228767 | A1* | 9/2011 | Singla et al. | 370/389 |
| 2012/0300773 | A1* | 11/2012 | Maeda et al. | 370/390 |
| 2013/0201984 | A1* | 8/2013 | Wang | 370/389 |
| 2014/0119203 | A1* | 5/2014 | Sundaram et al. | 370/250 |

FOREIGN PATENT DOCUMENTS

| JP | 2010-288168 A | 12/2010 |
|---|---|---|
| JP | 2012-039534 A | 2/2012 |

OTHER PUBLICATIONS

Japanese Office Action dated Sep. 29, 2015 with English translation.
Nao Tamura, Bringing Innovation to Data Center Network, New Technology "Ethernet Fabric", Part 3, Realizing Multipath by Function Separation, Vender-unique Implementation, Relationship Between Open Flow and Fabric, Nikkei Network, May 28, 2012, No. 146, pp. 59-63.

* cited by examiner

*Primary Examiner* — Christine Duong
(74) *Attorney, Agent, or Firm* — McGinn IP Law Group, PLLC (57) ABSTRACT

A port switch includes ports that are to serve as communication sources of communication lines extending to a plurality of fabric switches, and sets a link aggregation for the ports. The port switch further includes a fabric switch table indicating a correspondence relationship between each of the addresses of the fabric switches and the corresponding one of the ports. When the port switch receives a frame from a terminal, the port switch detects a destination address in the frame, determines, if the destination address is one of the addresses in the fabric switch table, a port corresponding to the one of the addresses, on the basis of the fabric switch table to transfer the frame from the port.

3 Claims, 4 Drawing Sheets

TBLU

| FDB | | LAGTBL | | SWFTBL | |
|---|---|---|---|---|---|
| PORT/LAGID | ADDRESS | LAGID | PORT | SWFID (ADDRESS) | PORT |
| LAGID1 | xxx | LAGID1 | P1,P2,... | SWFID1 | P1 |
| ⋮ | ⋮ | | | SWFID2 | P2 |
| Pu1 | zzz | | | ⋮ | ⋮ |
| ⋮ | ⋮ | | | | |

COMMUNICATION SYSTEM AND NETWORK RELAY APPARATUS

The present application is based on Japanese patent application No. 2012-250327 filed on Nov. 14, 2012, the entire contents of which are incorporated herein by reference.

BACKGROUND OF THE INVENTION

1. Field of the Invention

The present invention relates to a communication system and a network relay apparatus, and more particularly, relates to, for example, a maintenance and management technology for use in a communication system in which a link aggregation is used for communication from a single switching device to a plurality of switching devices.

2. Description of the Related Art

For example, Japanese Unexamined Patent Application Publication No. 2010-288168 describes a configuration including a plurality of leaf switches to each of which a terminal is connected, and a plurality of root switches each of which relays communication between the leaf switches. Each of the leaf switches is connected to the plurality of root switches via communication lines, transfers a packet received from the terminal to a specific root switch on the basis of a destination address thereof, and transfers a learning packet to a specific root switch on the basis of a transmission source address thereof.

SUMMARY OF THE INVENTION

In recent years, a technology of constructing a network system using, instead of chassis switch devices, combination of a plurality of box-type switch devices has drawn attention. In the network system, for example, a plurality of box-type switch devices (which will be hereinafter referred to as "port switches") used for ensuring a necessary number of ports and a plurality of box-type switch devices (which will be hereinafter referred to as "fabric switches") used for providing connection between the port switches are provided. Each of the port switches is connected to each of the fabric switches via a communication line, the fabric switches are connected in a star connection using a single port switch as a reference, and the port switches are connected in a star connection using a single fabric switch as a reference. Such a network system will be herein referred to as a box-type fabric system.

In a box-type fabric system, for example, a single port switch is connected to a plurality of fabric switches via a plurality of communication lines, and may set a single link aggregation for a plurality of ports serving as connection sources. When a link aggregation is set, load distribution and redundancy in the link aggregation may be implemented. Therefore, for example, when the communication band is to be expanded, additional fabric switches may be provided, thus allowing expansion of the communication band to be easily implemented at low costs. Furthermore, in the system, besides the expansion in communication band described above, the number of ports may be easily increased at low costs by providing additional port switches. As a result, using the system, as compared to a case where a system including chassis switch devices is used, a flexible system which meets user demands may be constructed at low costs.

Under these circumstances, there are cases where maintenance and management, including information collection, various settings, firmware update, and so forth, are to be performed on the fabric switches in the box-type fabric system. In such a case, in general, a method in which, in addition to a normal port connected to a port switch, a dedicated maintenance and management port (management port) is provided to connect a dedicated maintenance and management terminal to the dedicated port via a dedicated communication line is used. However, in this case, the number of ports, the number of communication lines, and so forth are increased, and therefore, it is preferable to implement maintenance and management using normal ports and communication lines, without using dedicated ports and communication lines (that is, it is preferable to implement in-band management).

In order to implement in-band management, for example, similar to a normal terminal, a dedicated maintenance and management terminal may be connected to a port switch to perform communication from the maintenance and management terminal to a specific fabric switch using a normal port and communication line that provides connection between the port switch and the fabric switch. However, in the port switch, a link aggregation is set for each port serving as a connection source of the communication line connected to the fabric switches, and thus, a frame received from the maintenance and management terminal might not be transferred to the specific fabric switch.

Accordingly, it is an object of the present invention to implement in-band management in a network relay apparatus in which a link aggregation is used and a communication system including the network relay apparatus. The above and other objects, features, and advantages of the present invention will be apparent from the following detained description of the preferred embodiments of the invention in conjunction with the accompanying drawings.

The outline of a typical embodiment of the present invention disclosed in the present application is briefly described below.

A communication system according to an embodiment includes a plurality of first switch device, a second switch device, and a terminal. The second switch device includes a plurality of first ports that are to serve as connection sources of communication lines extending to the plurality of first switch devices and sets a link aggregation for the plurality of ports. The terminal is connected to a second port of the second switch device. The second switch device further includes a switch table indicating a correspondence relationship between each of addresses of the plurality of first switch devices and a corresponding one of the plurality of first ports. The second switch device detects, when the second switch device receives a frame, a destination address in the frame, and determines, if the destination address is one of the addresses in the switch table, a port, among the plurality of first ports, which corresponds to the one of the addresses, on the basis of the switch table, to transfer the frame from the determined port.

An advantage of a typical embodiment of the present invention disclosed in the present application is that in-band management may be implemented in a network relay apparatus in which a link aggregation is used and a communication system including the network relay apparatus.

DESCRIPTION OF THE PREFERRED EMBODIMENTS

In the embodiments described below, the invention will be described in a plurality of sections or embodiments when required as a matter of conveniences. However, unless otherwise stated, these sections or embodiments are not irrelevant to each other, and the one relates to the entire or a part of the other as a modification example, details, or a supplementary explanation thereof. Also, in the embodiments described below, when referring to the number of elements (including the number of pieces, numerical value, amount, range, and so forth), the number of the elements is not limited to a specific number unless otherwise stated or except the case where the number is apparently limited to a specific number in principal. The number larger or smaller than the specific number is also applicable.

Furthermore, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. This condition is also applicable to the numerical value and the range described above.

Embodiments will be hereinafter described with reference to the accompanying drawings. Note that, in all the drawings for describing the embodiments, the same components are identified by the same reference characters and the repeated descriptions will be omitted.

<<Outline of Box-Type Fabric System and Problems Thereof>>

Figure 4:
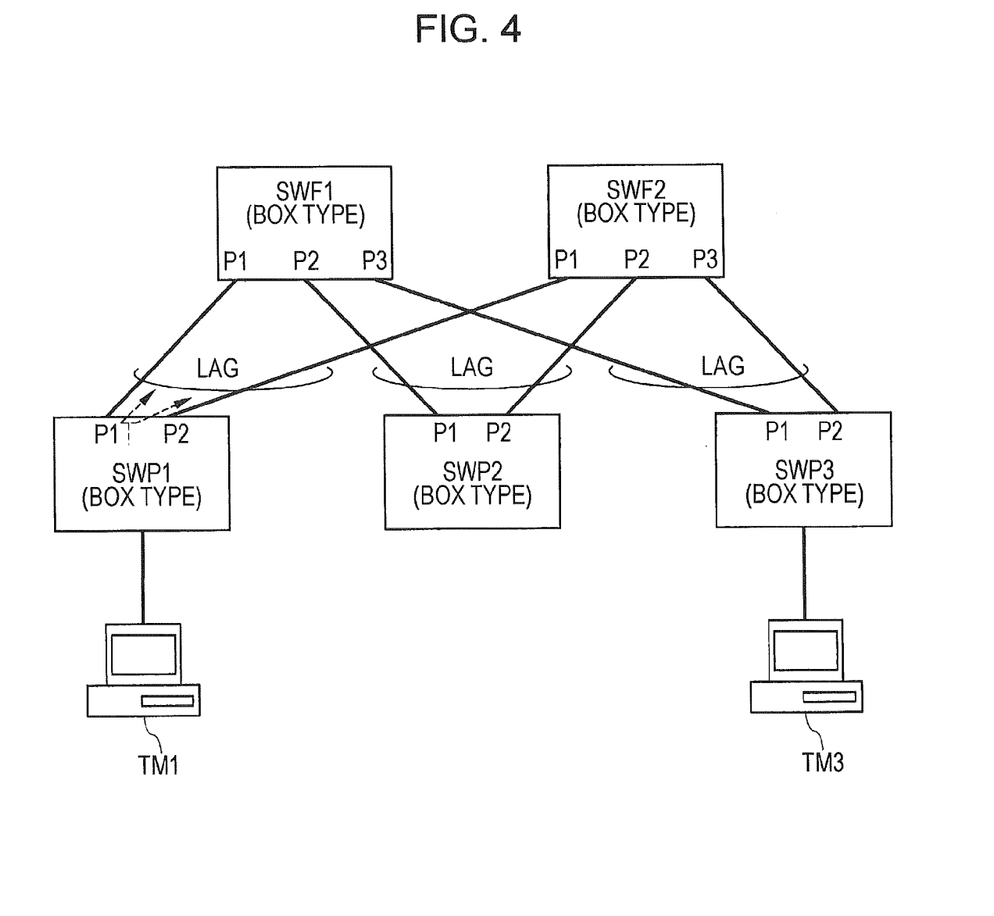
FIG. 4 is a diagram schematically illustrating an example configuration of a box-type fabric system in a communication system as a premise of the present invention and an example of problems thereof.

FIG. 4 is a diagram schematically illustrating an example configuration of a box-type fabric system in a communication system as a premise of the present invention and an example of problems thereof. As illustrated in FIG. 4, the box-type fabric system includes a plurality of (three in this case) port switches SWP1 to SWP3, each of which is implemented by a box-type switch device, and a plurality of (two in this case) fabric switches SWF1 and SWF2, each of which is implemented by a box-type switch device. The fabric switches SWF1 and SWF2 construct communication paths between the port switches SWP1 to SWP3 and relay communications between terminals (for example, a terminal TM1 and a terminal TM3 in FIG. 4) each of which is connected to SWP1 to SWP3.

Each of the port switches SWP1 to SWP3 is connected to each of the fabric switches SWF1 and SWF2 via a different communication line. A port P1 and a port P2 of the port switch SWP1 are connected to a port P1 of the fabric switch SWF1 and a port P1 of the fabric switch SWF2, respectively, via different communication lines. Also, the port P1 and port P2 of the port switch SWP2 are connected to the port P2 of the fabric switch SWF1 and the port P2 of the fabric switch SWF2, respectively, via different communication lines and, similarly, the port P1 and port P2 of the port switch SWP3 are connected to the port P3 of the fabric switch SWF1 and the port P3 of the fabric switch SWF2, respectively, via different communication lines. Although not specifically limited, the port switches and the fabric switches are implemented respectively by box-type switch devices having the same configuration, and whether each of the switches functions as a port switch or a fabric switch may be selected by internal settings.

In the box-type fabric system, each port switch (for example, SWP1) may set a single link aggregation for the ports P1 and P2 that are to serve as connection sources of a plurality of (two in this case) communication lines between the plurality of fabric switches SWF1 and SWF2. Herein, an aggregation of the ports (P1 and P2 in this case) for which the link aggregation is set will be referred to as a "link aggregation group LAG". The ports (P1 and P2) for which the link aggregation (the link aggregation group LAG) is set logically functions as a single port, and load distribution in the link aggregation group LAG is implemented.

For example, assume the case where a frame is transmitted from the terminal TM1 connected to the port switch SWP1 to the terminal TM2 connected to the port switch SWP3. In this case, the port switch SWP1 automatically distributes, on the basis of a predetermined rule, the frame received from the terminal TM1 to a communication path extending from the port P1 to the port switch SWP3 via the fabric switch SWF1 or a communication path extending from the port P2 to the port switch SWP3 via the fabric switch SWF2. As the predetermined rule, although not specifically limited, for example, a method in which an operation is performed using head information (more specifically, a transmission source and/or a destination address (media access control or MAC), an IP address, and so forth) may be used.

As has been described, the ports (for example, the ports P1 and P2 of the port switch SWP1) for which the link aggregation group LAG is set are physically a plurality of ports but serve as a single logical port, when automatic load distribution on the basis of the predetermined rule is performed.

There are also cases where in-band management (typically, information collection, various settings, firmware update, and so forth) of, for example, the fabric switch SWF1 is to be performed using the terminal TM1 as a maintenance and management terminal. In this case, for example, a frame whose destination address is the fabric switch SWF1 is transmitted from the terminal TM1 to the port switch SWP1, but the frame is automatically distributed by the port switch SWP1 from the port P1 of the port switch SWP1 or the port P2 thereof on the basis of the predetermined rule. Thus, there might be cases, when the frame is distributed to the port P2 of the port switch SWP1, the frame is not transmitted to the fabric switch SWF1 which is the target destination.

<<Configuration and Operation of Communication System According to this Embodiment>>

Figure 1:
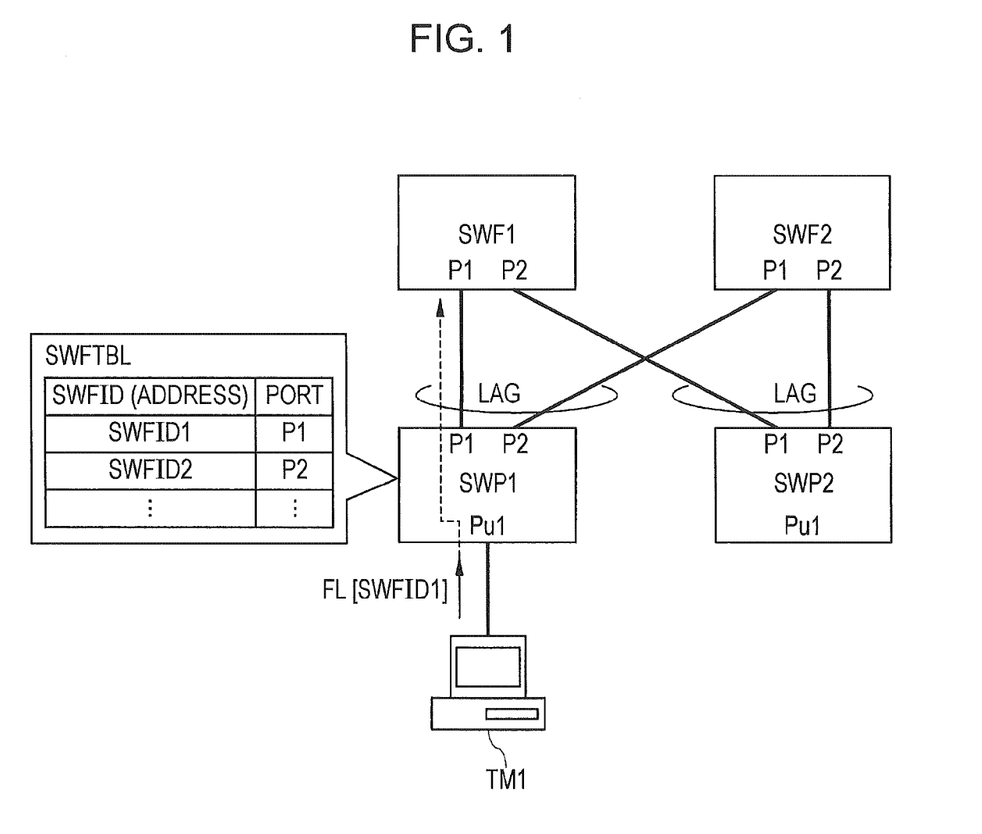
FIG. 1 is a block diagram schematically illustrating an example configuration and an example operation of a major portion of a communication system according to an embodiment of the present invention.

FIG. 1 is a block diagram schematically illustrating an example configuration and an example operation of a major portion of a communication system according to an embodiment of the present invention. The communication system illustrated in FIG. 1 includes a plurality of (two in this case) fabric switches (first switch devices) SWF1 and SWF2 and a plurality of (two in this case) port switches (second switch devices) SWP1 and SWP2, which are illustrated in FIG. 4. As described above, the switches SWF1, SWF2, SWP1, and SWP2, each of which is implemented by a box-type switch device, form as a whole a box-type fabric system.

The port switch SWP1 includes ports (first ports) P1 and P2 each of which is to serve as a connection source of each of communication lines between the fabric switches SWF1 and SWF2, and a port Pu1. The port switch SWP1 sets a link aggregation (a link aggregation group LAG) for the ports (the first ports) P1 and P2. Similarly, the port switch SWP2 includes ports (the first ports) P1 and P2 each of which is to serve as a connection source of each of communication lines between the fabric switches SWF1 and SWF2, and a port Pu1. The port switch SWP2 sets a link aggregation group LAG for the ports (the first ports) P1 and P2. In this case, a terminal TM1 is connected to the port Pu1 of the port switch SWP1. The terminal TM1 serves, for example, as a maintenance and management terminal.

In this case, the port switch SWP1 includes a fabric switch table (a switch table) SWFTBL indicating a correspondence relationship of a switch identifier (an address) SWFID of each of the fabric switches (the first switch devices) SWF1 and SWF2 with the ports P1 and P2, and a main feature of the port switch SWP1 is that the port switch SWP1 performs processing on the basis of the fabric switch table SWFTBL. Specifically, when the port switch SWP1 receives a frame FL from the terminal TM1, the port switch SWP1 first detects a destination address in the frame FL. Subsequently, if the detected destination address is one of the switch identifiers (the addresses) SWFID in the fabric switch table SWFTBL, the port switch SWP1 determines a port, i.e., one of the ports (the first ports) P1 and P2, which corresponds to the address on the basis of the fabric switch table SWFTBL and transfers the frame FL from the port.

In the example of FIG. 1, the port switch SWP1 receives the frame FL whose destination address is the address (SWFID1) of the fabric switch SWF1 from the terminal TM1. In response to this, the port switch SWP1 first detects the destination address (SWFID1) from the frame FL. Then, since the destination address (SWFID1) is one of the switch identifiers (the addresses) SWFID in the fabric switch table SWFTBL, the port switch SWP1 determines the port P1 corresponding to the destination address (SWFID1) on the basis of the fabric switch table SWFTBL and transfers the frame FL from the port P1 to the fabric switch SWF1.

Thus, in spite that the link aggregation group LAG is set for the ports P1 and P2, the port switch SWP1 is enabled to transfer the frame whose destination address is the fabric switch SWF1 to the fabric switch SWF1. As a result, in-band management of the fabric switch SWF1 by terminal TM1 may be implemented. Also, similarly, as a matter of course, if a frame whose destination address is the fabric switch SWF2 is used, in-band management of the fabric switch SWF2 by the terminal TM1 may be implemented.

Implementing such in-band management is more advantageous, in particular, in the box-type fabric system. In the box-type fabric system, switch devices are physically arranged in an appropriately distributed manner. Thus, for example, in the above-described method in which the dedicated maintenance and management port (a management port) is provided, the number of communication lines might be increased or, when an additional fabric switch is provided, an additional communication path for use in maintenance and management is constructed, and thus, the operation of the box-type fabric system might be complicated. However, implementing in-band management using the method illustrated in FIG. 1 resolves the above-described problems and maintenance and management may be simplified.

The fabric switch table (the switch table) SWFTBL may be generated, for example, using a method in which the terminal TM1 performs communication to the port switch SWP1 or a method in which communication is performed between the port switch SWP1 and the fabric switches SWF1 and SWF2 using a dedicated communication protocol. Of these methods, specifically, the latter one is preferably used, and thus, whether each communication line between the port switch SWP1 and the fabric switches SWF1 and SWF2 is in a normal state or in an error state may be appropriately monitored, and also, even when an additional fabric switch (for example, a fabric switch SWF3 which is not illustrated) is provided, and the like, adjustment may be easily made.

Specifically, for example, each of the fabric switches (SWF1 and SWF2 in this case) regularly transmits a control frame including the switch identifier (the address) SWFID (SWFID1 and SWFDI2 in this case) thereof to the port switch SWP1. In response to this, the port switch SWP1 registers the correspondence relationship of the switch identifier (the address) SWFID with the port (the ports P1 and P2 in this case) which has received the switch identifier (the address) SWFID in the fabric switch table (the switch table) SWFTBL. For example, when each of fabric switches SWF1 and SWF2 is a layer 2 (L2) level switch device, a MAC address may be used as the switch identifier (the address) SWFID and, when each of fabric switches SWF1 and SWF2 is a layer 3 (L3) level switch device, an IP address may be used as the switch identifier (the address) SWFID.

Thus, for example, when a failure occurs in a communication line between the port switch SWP1 and the fabric switch SWF1, the port switch SWP1 may detect the failure because the port switch SWP1 does not receive the control frame from the fabric switch SWF1 for a predetermined time period. Also, when an additional fabric switch is provided, the port switch SWP1 may register the switch identifier (the address) of the additional fabric switch in the fabric switch table (the switch table) SWFTBL by receiving the control frame from the additional fabric switch in a similar manner.

Note that, although the relationship between the port switch SWP1 and the fabric switches SWF1 and SWF2 has been mainly described, the relationship between the port switch SWP2 and the fabric switches SWF1 and SWF2 is similar thereto. That is, the port switch SWP2 generates a fabric switch table (a switch table) SWFTBL on the basis of a control frame transmitted from each of the fabric switches SWF1 and SWF2 and, if a maintenance and management terminal is connected to the port switch SWP2, the port switch SWP2 performs similar processing to that performed for the port switch SWP1 using the fabric switch table SWFTBL. Also, an example of the box-type fabric system including two port switches and two fabric switches has been described above. However, as a matter of course, the number of port switches and the number of fabric switches may be changed as appropriate.

Furthermore, although an example of the box-type fabric system has been described above, the embodiment is not limited thereto. That is, a configuration which includes a second switch device (for example, a port switch SWP1) and a plurality of first switches (for example, fabric switches SWF1 and SWF2) and in which a link aggregation group LAG is set for a plurality of ports serving as connection sources of communication lines extending from the second switch devices to the plurality of first switches may be used in a similar manner.

<<Configuration of Port Switch (Network Relay Apparatus)>>

Figure 2A:
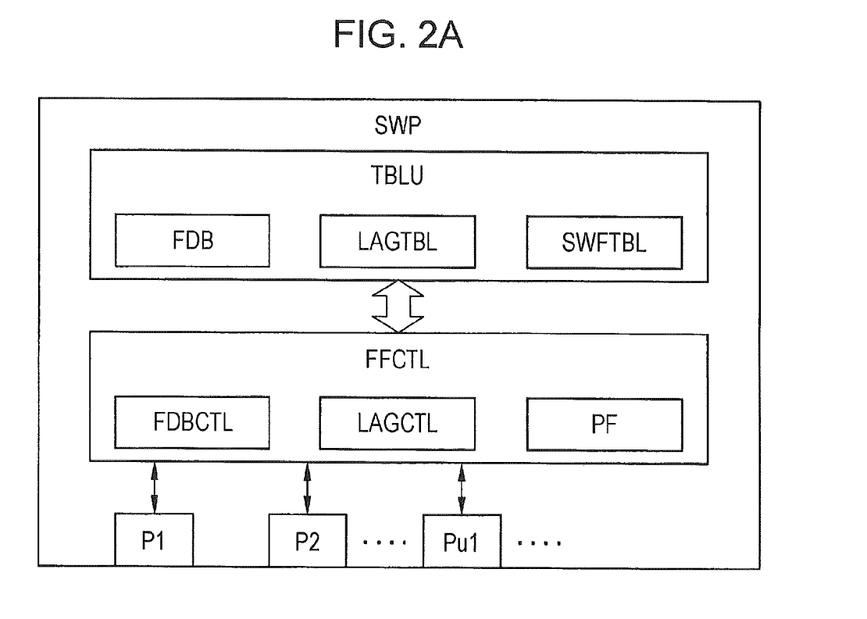
FIG. 2A is a block diagram schematically illustrating an example configuration of a major portion of a port switch (a network relay apparatus) in the communication system of FIG. 1
Figure 2B:
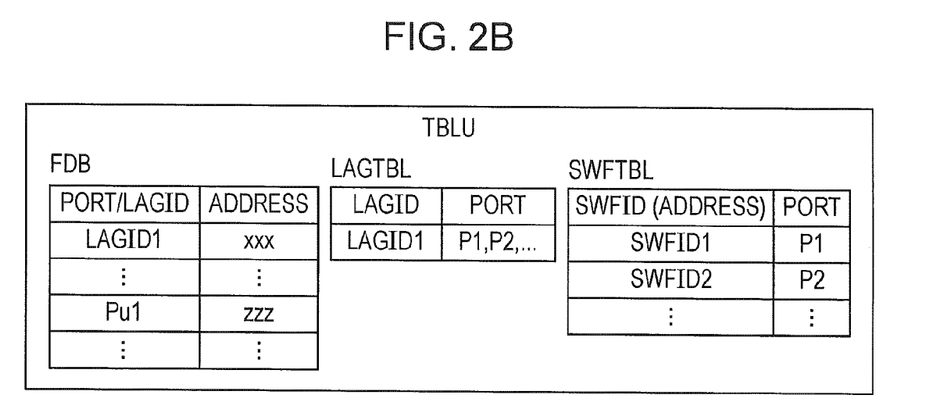
FIG. 2B is a block diagram illustrating an example structure of a table unit in FIG. 2A.

FIG. 2A is a block diagram schematically illustrating an example configuration of a major portion of a port switch (a network relay apparatus) in the communication system of FIG. 1, and FIG. 2B is a block diagram illustrating an example structure of a table unit in FIG. 2A. The port switch (the second switch device, the network relay apparatus) illustrated in FIG. 2A includes, for example, a frame transfer control section FFCTL, a table unit TBLU, a plurality of ports (P1, P2, . . . Pu1, . . . ), and so forth.

The ports P1, P2, are ports (first ports) for fabric switches. Looking at the port switch SWP1 of FIG. 1 as an example, the fabric switches SWF1 and SWF2 are connected to the ports P1 and P2, respectively. In this case, ports (first ports) for two fabric switches are illustrated as representatives. However, when three or more fabric switches are provided, the port switch accordingly includes three or more ports (first ports). The port Pu1 is a port for a terminal (or a subordinate switch device). For example, in the port switch SWP1 of FIG. 1, the terminal TM1 is connected to the port Pu1. In this case, a port for a single terminal is illustrated as a representative. However, when two or more terminals (or subordinate switch devices) are connected thereto, the port switch includes two or more ports accordingly.

As illustrated in FIG. 2A and FIG. 2B, the table unit TBLU includes, in addition to the above-described fabric switch table (switch table) SWFTBL, an address table FDB and a link table LAGTBL. The link table LAGTBL indicates for which port the link aggregation (the link aggregation group LAG) is set. In this example, the same LAG is set for the ports P1 and P2, and therefore, the same link aggregation identifier LAGID1 is allocated to the ports P1 and P2 in order to indicate that the same link aggregation group LAG for the ports P1 and P2. The address table FDB indicates the correspondence relationship of the plurality of ports ( . . . , Pu1, . . . ) or the link aggregation identifier LAGID and the addresses (MAC addresses) of terminals existing at ends of the plurality of ports or ends of ports corresponding to the link aggregation identifier LAGID. In this example of the address table FDB, an address "xxx" corresponds to the link aggregation identifier LAGID1 and this means that, on the basis of the link table LAGTBL, the address "xxx" exists at the end of any one of the ports P1, P2, . . . .

The frame transfer control section FFCTL includes a destination determination section FDBCTL, a link aggregation control section LAGCTL, and a transfer execution section (a packet filter section) PF. When the destination determination section FDBCTL receives a frame from any one of the plurality of ports (P1, P2, . . . Pu1, . . . ), the destination determination section FDBCTL detects the destination address in the frame, and obtains a port that is to serve as a destination corresponding to the destination address from the address table FDB. The link aggregation control section LAGCTL selects, as appropriate, a transfer port for use in actually transferring a frame in accordance with whether or not the link aggregation group LAG is set for the port that is to serve as a destination (that is, whether or not the port that is to be a destination is a port corresponding to the link aggregation identifier LAGID). If the link aggregation group LAG is set for the port that is to be a destination, the link aggregation control section LAGCTL refers to the link table LAGTBL to select, as the transfer port, a single port from the plurality of ports for which the link aggregation group LAG is set, on the basis of the predetermined rule.

The transfer execution section (the packet filter section) PF refers to the fabric switch table (the switch table) SWFTBL to select, as appropriate, a transfer port in accordance with whether or not the destination address in the received frame is one of the switch identifiers (the addresses) SWFID in the fabric switch table SWFTBL, and transfers the frame from the transfer port. If the destination address is one of the switch identifiers SWFID in the fabric switch table SWFTBL, the transfer execution section (the packet filter section) PF selects a port corresponding to the address as the transfer port on the basis of the fabric switch table SWFTBL, and transfers the frame from the transfer port.

<<Operation of Port Switch (Network Relay Apparatus)>>

Figure 3:
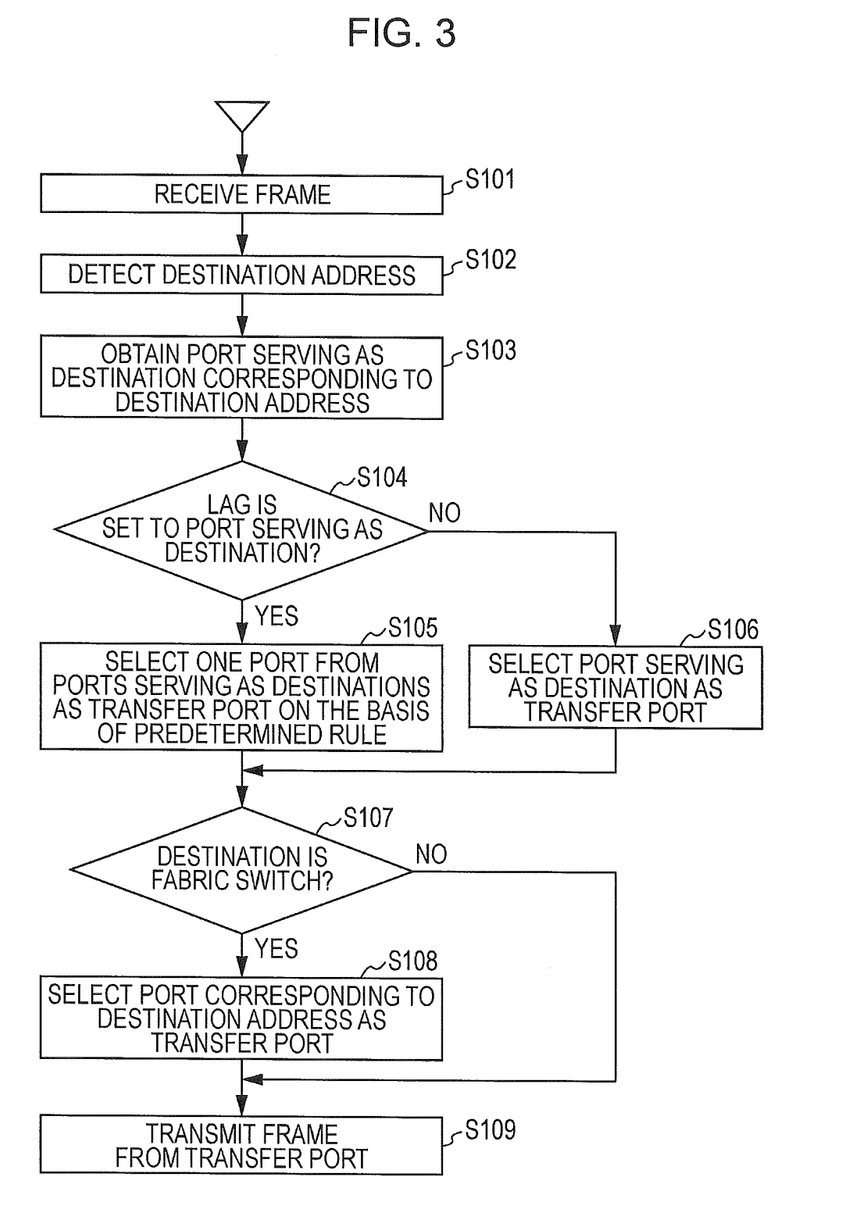
FIG. 3 is a flowchart of a major operation example in the port switch (the network relay apparatus) illustrated in FIG. 2A and FIG. 2B.

FIG. 3 is a flowchart of a major operation example in the port switch (the network relay apparatus) illustrated in FIG. 2A and FIG. 2B. As illustrated in FIG. 3, the port switch (the second switch device, the network relay apparatus) SWP first receives a frame from any one of the plurality of ports (P1, P2, . . . , Pu1, . . . ) (Step S101). Next, the port switch SWP (the destination determination section FDBCTL) detects the destination address in the frame (Step S102), and obtains a port that is to serve as a destination corresponding to the destination address from the address table FDB (Step S103).

Subsequently, the port switch SWP (the link aggregation control section LAGCTL) determines whether or not the link aggregation group LAG is set for the port that is to serve as a destination (that is, whether or not the port that is to serve as a destination is a port corresponding to the link aggregation identifier LAGID) (Step S104). If the link aggregation group LAG is set for the port that is to serve as a destination, the port switch SWP refers to the link table LAGTBL to select, as the transfer port, a single port from ports that are to serve as destinations (that is, the plurality of ports for which the link aggregation group LAG is set) on the basis of the predetermined rule (the hashing operation using the transmission source and/or the destination address) (Step S105). On the other hand, if the link aggregation group LAG is not set for the port that is to serve as a destination, the port switch SWP selects, as the transfer port, a port that is to serve as the destination (Step S106).

Next, the port switch SWP (the transfer execution section (the packet filter section) PF) refers to the fabric switch table (the switch table) SWFTBL to determine whether or not the destination address detected in Step S102 is one of the switch identifiers (the addresses) SWFID in the fabric switch table SWFTBL. In other words, the port switch SWP (PF) determines whether or not the destination address is a fabric switch (Step S107). If the destination address is one of the switch identifiers SWFID in the fabric switch table SWFTBL, the port switch SWP (PF) selects, as the transfer port, a port corresponding to the address on the basis of the fabric switch table SWFTBL (Step S108), and transfers the frame from the transfer port (Step S109). On the other hand, if the destination address is not one of the switch identifiers SWFID in the fabric switch table SWFTBL, the port switch SWP (PF) uses the transfer port selected by the link aggregation control section LAGCTL as it is, and transfers the frame from the transfer port (Step S109).

Using the above-described operation example, for example, as illustrated in FIG. 1, when the port switch SWP1 receives a frame whose destination address (SWFID1) is the fabric switch SWF1 from the terminal TM1, the port switch SWP1 executes Steps S104, S105, S107, S108, and S109 in this order to transfer the frame from the port P1. On the other hand, for example, as illustrated in FIG. 4, when the port switch SWP1 receives a frame whose destination address is the terminal TM3 from the terminal TM1, the port switch SWP1 executes Steps S104, S105, S107, and S109 in this order to transfer the frame from one of the ports P1 and P2. Note that, although not illustrated, for example, when the port switch SWP1 receives, from a terminal connected to a port (for example, the port Put) of the port switch SWP1 for a terminal, a frame whose destination address is a terminal connected to a port (for example, the port Pu2) of the port switch SWP1 for another terminal, the port switch SWP1 executes Steps S104, S106, S107, and S109 in this order to relay transfer between the terminals.

Note that, depending on the network relay apparatus, for example, as a security function (that is, a so called firewall function), a function of detecting predetermined information (for example, a destination address, a transmission source address, and so forth) in a frame and performing predetermined processing in accordance with a detection result is provided. The transfer execution section (the packet filter section) PF may be implemented, for example, by using the above-described function. Also, in the configuration of FIG. 4, parts in which Steps S107 and S108 are executed may be changed as appropriate. For example, a flow in which, when the destination address is not a fabric switch in Step S107 (N in Step S107), the processing of Steps S104 to S106 are executed may be employed.

The present invention has been specifically described on the basis of embodiments made by the present inventor. The present invention, however, is not limited to the above-described embodiment but may be modified variously in design without departing from the scope and spirit of the invention. For example, the above-described embodiment is described in detail to make the present invention easy to understand and, therefore, is not necessarily limited to a configuration including all components in the description. In addition, a part of the configuration of one embodiment may be replaced with the configuration of another embodiment, or the configuration of one embodiment may be added to the configuration of another embodiment. Also, another component may be added to, or a component may be deleted or replaced in, a part of the configuration of the embodiment.

For example, in FIG. 1, as each communication line between a port switch and a fabric switch (for example, a communication line between the port P1 of the port switch SWP1 and the port P1 of the fabric switch SWF1), a single communication line is provided. However, a configuration in which, as each communication line between a port switch and a fabric switch, a plurality of communication lines are provided and a link aggregation group LAG is set for ports that are to serve as connection ports of the plurality of communication lines may be employed. Specifically, for example, the port switch SWP1 sets the link aggregation group LAG to the ports P1 and P2, and also sets the link aggregation group LAG for the plurality of ports forming the port P1 and for the plurality of ports forming the port P2.

What is claimed is:

1. A communication system, comprising:
a plurality of first switch devices; and
a second switch device including a plurality of first ports that are to serve as connection sources of communication lines extending to the plurality of first switch devices and configured to set a link aggregation for the plurality of first ports,
wherein the second switch device includes a switch table indicating a correspondence relationship between each of addresses of the plurality of first switch devices and a corresponding one of the plurality of first ports, an address table indicating a correspondence relationship between each of a plurality of ports thereof including the plurality of first ports and a corresponding one of addresses of terminals that exist at ends of the plurality of ports, and a link table indicating for which port the link aggregation is set;
a destination determination section that detects, when the second switch device receives a frame, a destination address in the frame and obtains a port that is to serve as a destination corresponding to the destination address from the address table,
a link aggregation control section that refers to the link table to select, if the link aggregation is set for the port that is to serve as the destination, a single port as a transfer port from the plurality of ports for which the link aggregation is set, on a basis of a predetermined rule, and to select, if the link aggregation is not set for the port that is to serve as the destination, the port that is to serve as the address as the transfer port;
a transfer execution section that refers to the switch table to transfer, if the destination address in the frame is one of the addresses in the switch table, a port corresponding to the one of the addresses as the transfer port to transfer the frame from the port, and to transfer, if the destination address in the frame is not one of the addresses in the switch table, the frame from the transfer port selected in the link aggregation control section; and
wherein, if the destination address is one of the addresses in the switch table, a port, among the plurality of first ports, which corresponds to the one of the addresses, on a basis of the switch table, to transfer the frame from the determined port.

2. The communication system according to claim 1,
wherein a plurality of the second switch devices are provided,
wherein each of the plurality of first switch devices and the plurality of second switch devices is implemented by a box-type switch device, and
wherein the plurality of first switch devices relay communications between terminals connected respectively to the plurality of the second switch devices.

3. A network relay apparatus, comprising:
a plurality of first ports that are to serve as connection sources of communication lines extending to the plurality of first switch devices; and
a switch table indicating a correspondence relationship between each of addresses of the plurality of first switch devices and a corresponding one of the plurality of first ports, and an address table indicating a correspondence relationship between each of a plurality of ports thereof including the plurality of first ports and a corresponding one of addresses of terminals that exist at ends of the plurality of ports,
a link table indicating for which port the link aggregation is set;
a destination determination section that detects, when the second switch device receives a frame, a destination address in the frame and obtains a port that is to serve as a destination corresponding to the destination address from the address table;
wherein a link aggregation is set for the plurality of first ports,
a link aggregation control section that refers to the link table to select, if the link aggregation is set for the port that is to serve as the destination, a single port as a transfer port from a plurality of ports for which the link aggregation is set, on a basis of a predetermined rule, and to select, if the link aggregation is not set for the port that is to serve as the destination, the port serving as the address as the transfer port;
a transfer execution section that refers to the switch table to transfer, if the destination address in the frame is one of the addresses in the switch table, a port corresponding to the one of the addresses as the transfer port to transfer the frame from the port, and to transfer, if the destination address in the frame is not one of the addresses in the switch table, the frame from the transfer port selected in the link aggregation control section; and wherein, if the destination address is one of the addresses in the switch table, a port, among the plurality of first ports, which corresponds to the one of the addresses is determined, on a basis of the switch table, and the frame is transferred from the determined port.

\* \* \* \* \*